US006422802B1

(12) United States Patent
Herrin

(10) Patent No.: US 6,422,802 B1
(45) Date of Patent: Jul. 23, 2002

(54) PRODUCE UNLOADING APPARATUS AND ASSOCIATED METHODS FOR ACHIEVING SMOOTH DISCHARGE AND RETURN

(76) Inventor: Robert M. Herrin, 5935 Groveline Dr., Orlando, FL (US) 32810

(*) Notice: Subject to any disclaimer, the term of this patent is extended or adjusted under 35 U.S.C. 154(b) by 0 days.

(21) Appl. No.: 09/619,906

(22) Filed: Jul. 19, 2000

(51) Int. Cl.⁷ .......................... B65G 65/02; B65G 65/23
(52) U.S. Cl. ...................................... 414/419; 414/425
(58) Field of Search ................................ 414/419, 421, 414/425

(56) References Cited

U.S. PATENT DOCUMENTS

| | | | | |
|---|---|---|---|---|
| 2,129,394 A | * | 9/1938 | Allen | 414/421 |
| 3,814,270 A | * | 6/1974 | Murphy | 414/421 |
| 4,277,219 A | * | 7/1981 | Rivers | 414/421 |
| 4,527,939 A | * | 7/1985 | Suarez | 414/425 |
| 5,797,716 A | * | 8/1998 | Herrin | 414/421 |

* cited by examiner

*Primary Examiner*—John M. Jillions
(74) *Attorney, Agent, or Firm*—Allen, Dyer, Doppelt, Milbrath & Gilchrist, P.A.

(57) ABSTRACT

A container contents unloading apparatus and methods are provided for distributing load lift and effecting a smooth rotational pivot of a container-holding carriage to slidably discharge the content of the held container and smoothly return the emptied container to an originating position. The container contents unloading apparatus preferably includes a load distributing lifter, preferably provided by a pair of endless loops to propel and guide lift and return movement, a load distributing arm to evenly distribute load lift, and a link connecting a container holding carriage. The endless loops are propelled through a closed path, the closed path having a first and second centerline inclined with respect to one another.

28 Claims, 4 Drawing Sheets

PRODUCE UNLOADING APPARATUS AND ASSOCIATED METHODS FOR ACHIEVING SMOOTH DISCHARGE AND RETURN

FIELD OF THE INVENTION

This application is related to the packing industry and, more specifically, to loading and unloading containers.

BACKGROUND OF THE INVENTION

The produce industry provides a ready example of the need for efficient methods and devices directed to the unloading of containers. For example, in the produce industry, produce is gathered using various techniques, then sorted, prepared, and packed for ultimate shipping to downstream wholesale and retail markets. Gathered produce, however, generally varies with each item of produce as to its size, shape, and quality. This variability affects how produce is sorted, graded, prepared and packed. It is also a factor in other industries involving package handling generally. Various systems have been developed over the years with the intent to more efficiently handle the grading, sorting, preparing, and packaging of produce and other items. Nonetheless, handling and packaging produce and other items remains extremely labor intensive, in the sense that manual labor is a primary factor of production input in all handling and packaging efforts. This factor gives rise to many problems associated with unloading or loading containers. For example, manual labor is frequently contracted-for on a short-term basis and often subject to frequent interruptions in the supply of labor thereby adversely affecting the scheduling of loading and unloading containers and related labor schedules.

The ability of managers to monitor and maintain the level of care exerted by manual laborers in carrying out container loading and unloading along with related packaging chores affects both the rate and quality of packing output. The resulting variability and uncertainty related to labor supply, packing speed, and packing quality add to the overall administrative costs of package handling operations. Other package handling systems directly addressing some of the problems have also developed over the years, especially relating to "containerization." Forklifts and other machinery useful for loading and unloading also have facilitated bulk packing and transportation using such containers.

Nonetheless, there are limits to the efficiencies created using containerization and existing machinery, especially in produce handling where numerous small objects must be loaded into containers often at a remote field site and then unloaded en mass at a central processing point. Produce, aside from comprising numerous small articles, must be sorted according to relatively small variations in size. Of particular importance is the avoidance of unnecessary or rough transfer movements in the loading and, especially, the unloading process. Conventional container unloading systems exhibit many problems in this respect. Existing systems that attempt to mechanize what would otherwise be done by manual labor thus nonetheless give rise to risks of roughly mishandling produce or other container product.

Some newer methods provide smoother mechanical movements. For example an earlier patent of the Applicant (Herrin, U.S. Pat. No. 5,797,716) describes an apparatus and methods for "kiss contact" product handling. These methods, however, do not completely smooth pivotal rotational movements, and moreover achieve smoother discharge and return movements utilizing a single-centered boom arm for providing container lift. Containers being unloaded must inevitably be pivoted along an axis of rotation roughly perpendicular to the plane of pivot for discharging the container contents, concentrating stress on the boom arm and the pivot axis. (See Applicant's earlier patent, Herrin U.S. Pat. No. 5,797,716). If the container does not rotate efficiently through the pivot plane, the energy and machinery costs of driving such a mechanism will be correspondingly higher, especially in terms of wear and tear on the associated mechanical elements of the system. Thus, from both a marketing and operations control perspective, unsmooth movement and undistributed stress in discharging the contents of container, inevitably lead to bruised produce and stress and put costly strains on container handling equipment.

SUMMARY OF THE INVENTION

With the foregoing in mind, it is an object of the present invention to provide a container contents unloading apparatus and method that effects a smooth operational discharge and return of an open-ended container and return of the emptied container, specifically by providing a more fluid, smoother movement through the pivot plane as the container is pivoted to discharge the contents followed by a smooth return of the emptied container for repeating the process.

It is a related, though additional objective, to produce rotational pivot movement that distributes the load stress on the lift elements and the pivot axis, thereby achieving not only smoother, more fluid pivotal rotational movement but doing so in a manner that reduces wear and tear on the associated lift elements. Thus, it is also an object of the present invention to provide a container contents unloading apparatus and method that eliminates the stress placed on boom arms and mechanical elements found in more conventional systems by replacing those elements with an alternative pivoting mechanism.

It further is an object of the present invention to provide a container contents unloading apparatus and method that facilitates the efficient maintenance and replacement of parts of a container contents unloading system. With respect to this object of the present invention, specific mechanisms are employed to utilize less expensive and more easily replaced components.

It is still another object of the present invention to more efficiently control the discharge of a container to effect a more steady and stable transfer from the container to a receiving device of the container contents, thereby providing a more manageable flow of the amount of produce being transferred onto, for example, a produce conveyor when a container having produce is emptied onto the produce conveyor.

It is a still further object of the present invention to provide greater speed to the pivoting movement for discharging container content and returning the emptied container without adversely affecting the smoothness of the pivotal lift or return-to-position movements. Achieving this objective thus allows for rapid and efficient container handling while relieving stress on the systems mechanical elements and reducing the risk of improper handling of produce that would bruise or otherwise adversely affect the quality of the discharged container content.

More particularly, a container contents unloading apparatus and methods for discharging a filled container more smoothly and fluidly thereby enhancing overall handling efficiency in unloading of container contents is provided according to the present invention. The apparatus preferably includes a container conveyor positioned to convey a plurality of filled open-ended containers. A container carriage is positioned within a frame overlying the container conveyor for slidably receiving filled containers as they are conveyed along the container conveyor. An upper portion of an end (i.e., the proximal end) of the carriage is pivotally connected to the frame to create a pivot axis. Pivoting movement is effected by a lifting of the other end (i.e., the distal end) of the carriage thereby causing the carriage to pivot at the proximal end about the pivot axis as the distal end is lifted. Specifically, the lower portion of the distal end of the carriage is lifted upward once the carriage has slidably received a filled open-ended container. The open-ended carriage-held container thereby pivots, and the product contained therein is discharged through the container's open end. The carriage then returns to an originating position and releases the emptied container.

The upward lift is caused by movement of at least two endless loops (e.g., belts or chains) that rotate in closed paths about rollers connected to the frame. Each loop is preferably connected to a link that is connected to the carriage. Thus, driving the loops propels the link connecting the loops and the carriage, resulting in the upward lift and pivot of the carriage.

Preferably, rollers support each loop and are aligned so that each loop has two distinct center lines, one extending upward from the distal end of the closed path to an intermediate point and the other extending downward from the intermediate point to the proximal end of the closed path. This belt and roller arrangement causes the link to move in a manner that smooths the upward lift and fluidly returns the container carriage to its initial position for releasing the emptied container and receiving for discharging another filled container. Specifically, the distal end of the link moves along the identical closed path of the loops, first upwardly from distal to intermediate point, then downwardly from intermediate to distal point, then upwardly from distal to intermediate point, and finally, completing the closed path, moving downwardly from intermediate to distal end point. The movement of the link propels the lower portion of the distal end of the carriage to sweep through the pivot plane about the pivot axis.

This smoother, more fluid movement, as pointed out above, provides a correspondingly smoother discharge of the container contents as well as a smoother, more fluid return of the emptied container. Moreover, by smoothing the movement of the link, the present invention reduces wear and tear on the system, especially as compared, for example, to systems using a rotatable boom arm. Replacing a boom arm with a combination loop (e.g., endless belt or chain) and rollers provides additional advantages alluded to above in regard to maintenance of the system: that is, the loop and roller arrangement is structurally simpler and facilitates replacement of individual discrete pieces (i.e., the belt and/or any subset of rollers). Thus the advantages of the present invention are multifold, including effecting smoother rotational pivot in a plane for discharging the contents of container and returning the container to an originating position, distributing the load stress in lifting, and facilitating easy maintenance of the system.

BRIEF DESCRIPTION OF THE DRAWINGS

Some of the features, advantages, and benefits of the present invention having been stated, others will become apparent as the description proceeds when taken in conjunction with the accompanying drawings in which.

DETAILED DESCRIPTION OF PREFERRED EMBODIMENTS

The present invention will now be described more fully hereinafter with reference to the accompanying drawings in which preferred embodiments of the invention are shown. This invention, however, can be embodied in many different forms and should not be construed as limited to the illustrated embodiments set forth herein. Rather, applicant provides these embodiments so that this disclosure will be thorough and complete, and will fully convey the scope of the invention to those skilled in the art. Like numbers refer to like elements throughout.

Figure 1:
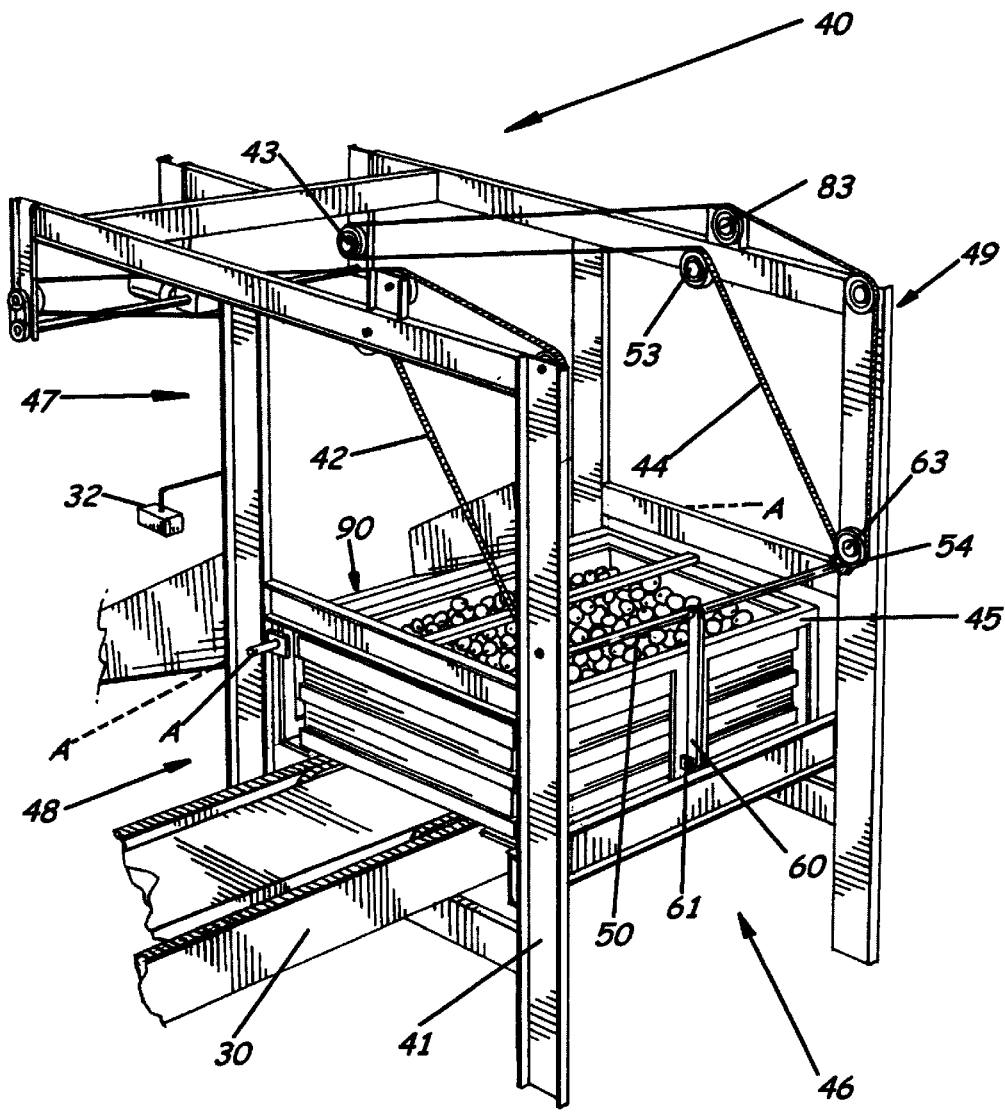
FIG. 1 is a front perspective view of a container contents unloading apparatus for unloading container product according to the present invention.
Figure 2:
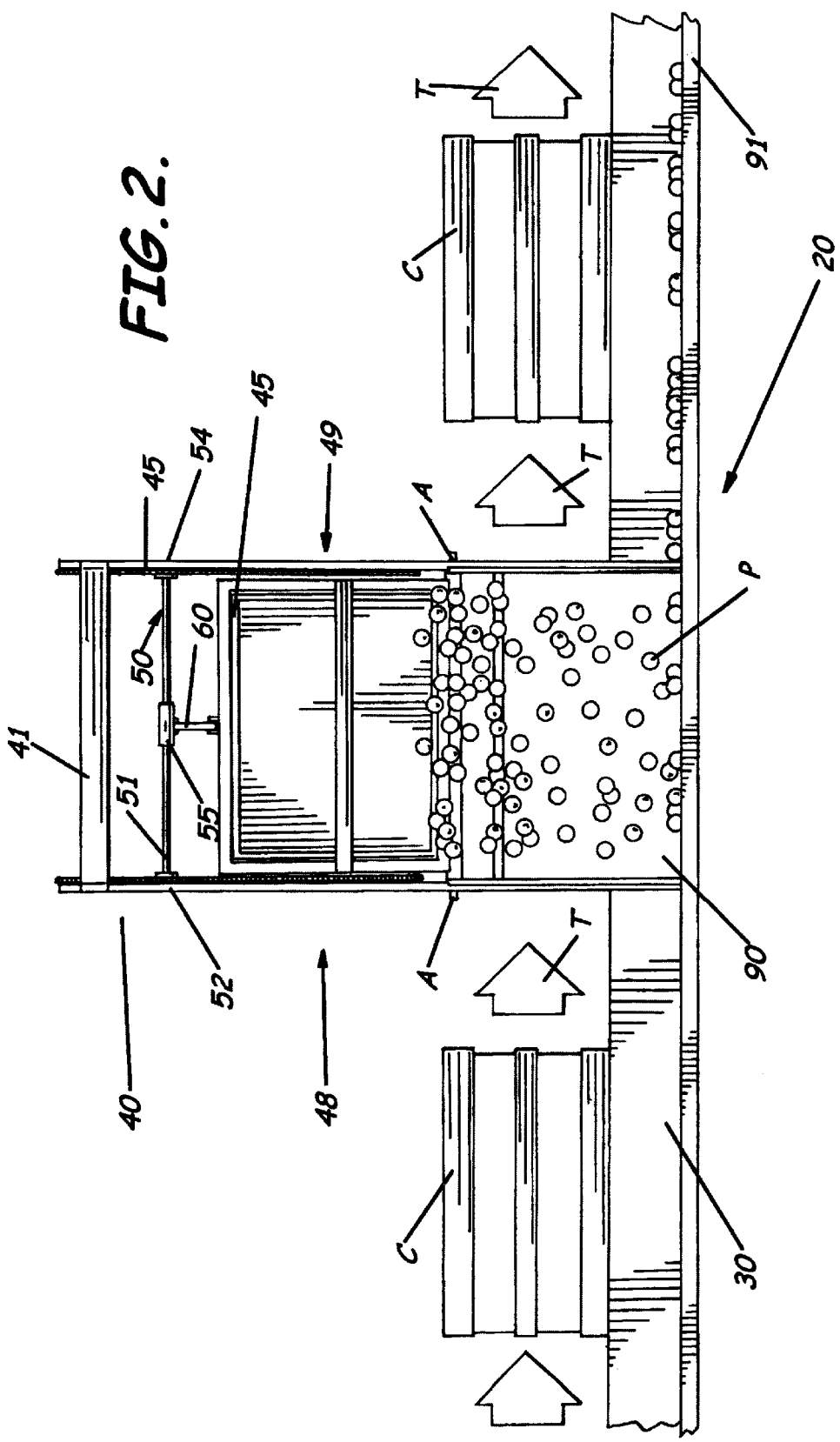
FIG. 2 is a rear elevational view of the container content unloading apparatus, operably overlying a container conveyor and unloading produce positioned in a container onto a discharged contents conveyor according to the present invention.

FIGS. 1 and 2 are perspective views of a container contents dumping system 20 for discharging the contents of a filled open-ended container C and returning the emptied container C for repeat use of the container C in conveying products. The system 20 as illustrated includes a horizontally extending container conveyor 30 for conveying filled open-ended containers C along a horizontal path of travel T. Containers are conveyed continuously downstream to a dumper 40 until positioned for the contents to be discharged. Containers are received seriatim by the dumper 40, and as each container is received, a container-presence sensor 32 detects the receipt of a filled container and signals to halt the downstream conveyance of containers and initiate the dumping procedure for the received container. The system 20 proceeds with the dumping of the contents and the return of the emptied container C to the conveyor, with the procedure being repeated as many times as necessary to discharge a given number of filled containers.

An apparatus 40 according to the present invention is especially advantageous in the produce industry, for example. Produce handling ordinarily involves extremely labor intensive processes of gathering, grading, sorting, and packing produce. There are inherent problems with these endeavors. Producers and transportation firms must search to find sufficient manpower for the labor needed. There can be frequent and costly interruptions to the labor supply, and the work, of course, can be quite physically demanding on laborers. Providing an automated alternative to these otherwise extremely labor intensive efforts provides considerable economic and social benefits, but mechanical dumping carries its own risks. Produce that is not dumped sufficiently smoothly will injure the produce being handled and packaged; this is costly to businesses and devalues the benefits obtained from the produce by consumers. Moreover, insufficient care in handling also puts inordinate wear and tear on machinery and produce containers.

The present invention is intended not merely to provide an mechanical means for discharging the content of containers as an alternative to labor-intensive means, but also to provide a mechanism for effecting the processes with sufficient fluidity of motion and smoothness as to eliminate the economically destructive damage to produce and equipment. Moreover, while the invention is described herein in the context of produce handling, it will be clearly understood by those skilled in the art that the invention can easily be applied in any number of industries and to virtually all endeavors where fluidly smooth and efficient product handling is highly desirable or essential.

As illustrated in FIG. 1, the present invention preferably has a frame 41, having distal and proximal ends, as well as an upstream side 48 and downstream side 49. The frame includes a plurality of frame members and overlies the horizontally extending container conveyor 30. The conveyor starts from a downstream end where containers C filled with produce are received and extends to and past the overlaying frame 41 so as to convey to the dumper open-ended containers C filled with produce or other product P.

As noted above and perhaps more fully illustrated by FIG. 2, the container conveyor is positioned to convey along a horizontal path of travel T a plurality of open-ended product containing containers. The frame 41 is adjacent and overlies the conveyor 30, being positioned downstream from where open-ended containers C are received onto the container conveyor. As most clearly shown in FIGS. 1, 2 and 3, the overlying frame contains a carriage 45. The carriage 45 is capable of slidably accepting filled open-ended containers C as they are conveyed downstream by the container conveyor 30. The carriage is also able to hold the slidably received open-ended containers C in order to pivot and effect the slidable discharge of product P from a carriage-held open-ended containers C, specifically in a manner that smoothly lifts, pivots, and returns the containers C.

The carriage 45 has an upper portion of a proximal end 47 pivotally connected to the frame so as to permit the carriage 45 to pivot about a pivot axis A when holding one of the plurality of open-ended containers C, slidably discharging the product P positioned in the open-ended container C, then returning to a container receiving position holding the held-open-ended container, and finally slidably releasing the open-ended container to the container conveyor 30 so as to be able to slidably receive for smooth dumping another open-ended container having product positioned therein.

A smoothly fluid pivotal rotation movement is imparted to the carriage by a load distributing lifter. The load distributing lifter provides means for effecting the movement of a carriage-held container for the smooth discharge of container contents and smooth return of the emptied container. The means furthermore distributes the lift load, reducing accordingly the load at each point of lift as compared to the stress induced by centered lifting and eliminating the torque induced in current conventional motorized boom lifting. The load distributing lifter preferably includes at least two tracks that when driven by a motor or other drive mechanism propel the lifting of the container-holding carriage, guiding its rotational movement about the pivot axis A. The track preferably is provided by a pair of spaced-apart endless loops 42, 44 (preferably endless belts or endless chains) each riding on separate pluralities of spaced-apart rollers 43. One embodiment of the load distribution lifting means, then, includes the two-spaced apart tracks 42, 44 attached to the frame 41, a load distributing arm 50, and a link 60 connecting the load distributing arm to the carriage 45.

Figure 3:
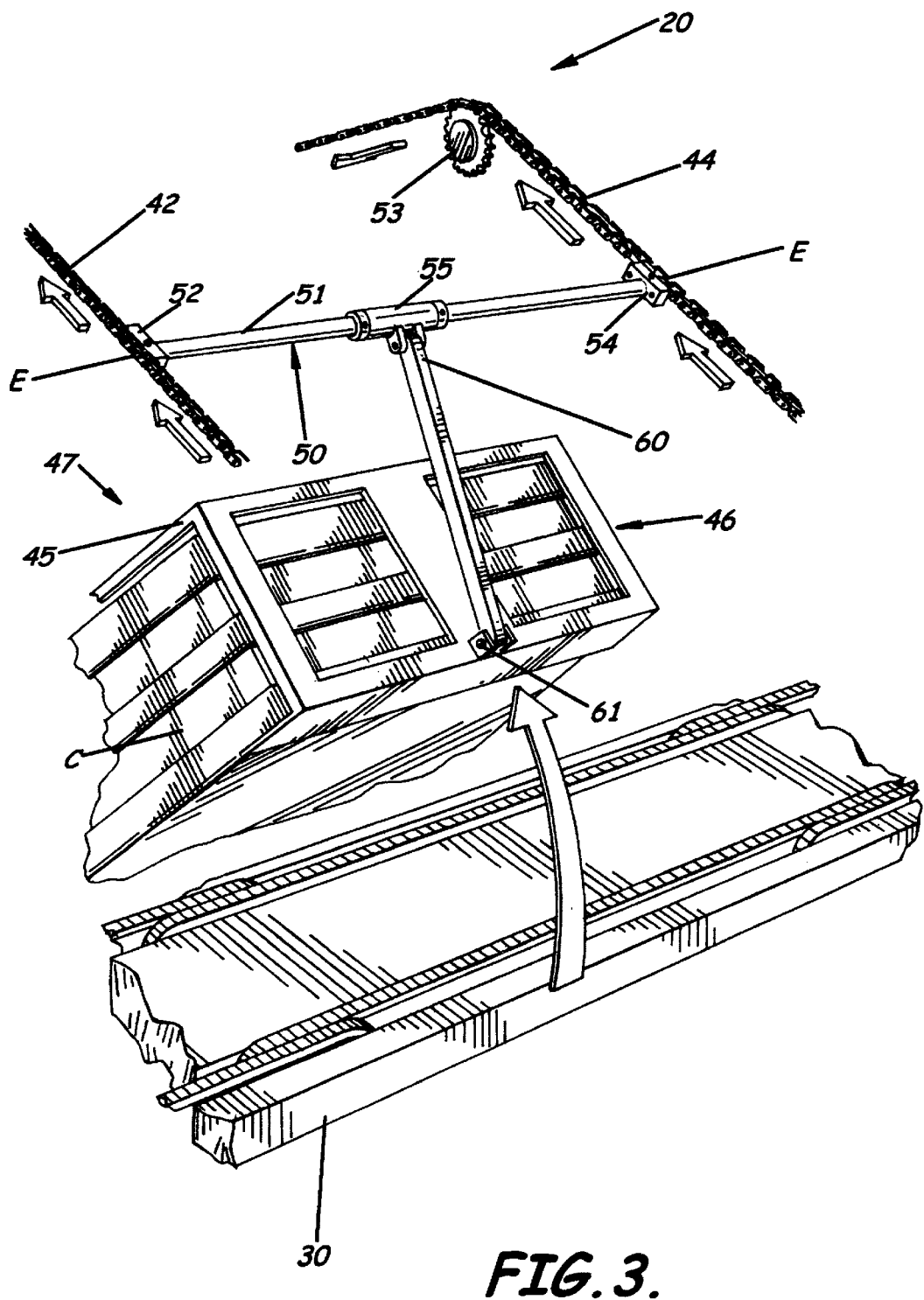
FIG. 3 is a fragmentary front perspective view of the operation of a carriage and load distributing lifter connected to a pair of endless loops lifting the carriage and a carriage-held container according to the present invention.

As illustrated perhaps most clearly in FIG. 3, the load distributing arm preferably has a dog-bone shape, including a substantially elongated body portion, a flanged first end portion 52, and a flanged second end portion 54 connected to a second end of the elongate body portion to provide enhanced connection strength where the second end portion is side-connected to the second endless loop. The first end portion 52 preferably is attached to one spaced-apart endless loop 42 and the second end portion 54 attached to the other spaced-apart endless loop 44. As further illustrated by FIG. 3, the load distributing arm 50 is positioned in reference to the frame 41 so as to be parallel to the pivot axis A. The tracks-connected lift arm has lift arm connecting sleeve 55 through which the arm extends, permitting full rotation of the arm around its elongate axis E. The sleeve 55 is attached to an upper portion of a link 60 that in turn is pivotally connected 61 to a lower portion of the distal end of the carriage and extends perpendicularly to connect to the sleeve at a medial portion of the load distributing arm 50.

As the endless loops 42, 44 move in a closed path over the rollers, the load distributing arm 50 moves in an equivalent closed path, and the medially attached thereto link lifts the lower portion of the distal end of the carriage. Again, it should be noted that the closed path has two distinct, inclined center lines L1, L2 dictated by the general shape of the closed paths formed by endless loops, perhaps best shown by the side view of FIG. 4. Each loop is mounted on a separate plurality of rollers positioned to have a first loop portion extending from the lowermost distal end roller 63 to an opposing first open end portion between the distal and proximal ends of the frame, a second loop portion extending from the lowermost proximal end roller 43 to an opposing second open end portion between the distal and proximal ends of the frame. There thus are first and second respective centerlines per loop, the first centerline being an imaginary straight line extending upwardly from a center of the lowermost distal end roller to the opposing first open end portion, and the second centerline being a second imaginary straight line extending upwardly from a center of the lowermost proximal end roller to the opposing second open end portion. In general, the rollers are aligned such that the second centerline is positioned transverse to the first centerline. It is to be emphasized that the arrangement thus described allows the load distributing lift to pivot the carriage in relation to the pivot axis, but with substantially reduced variation in the velocity of the load distributing lifter, as compared to existing systems.

Figure 4:
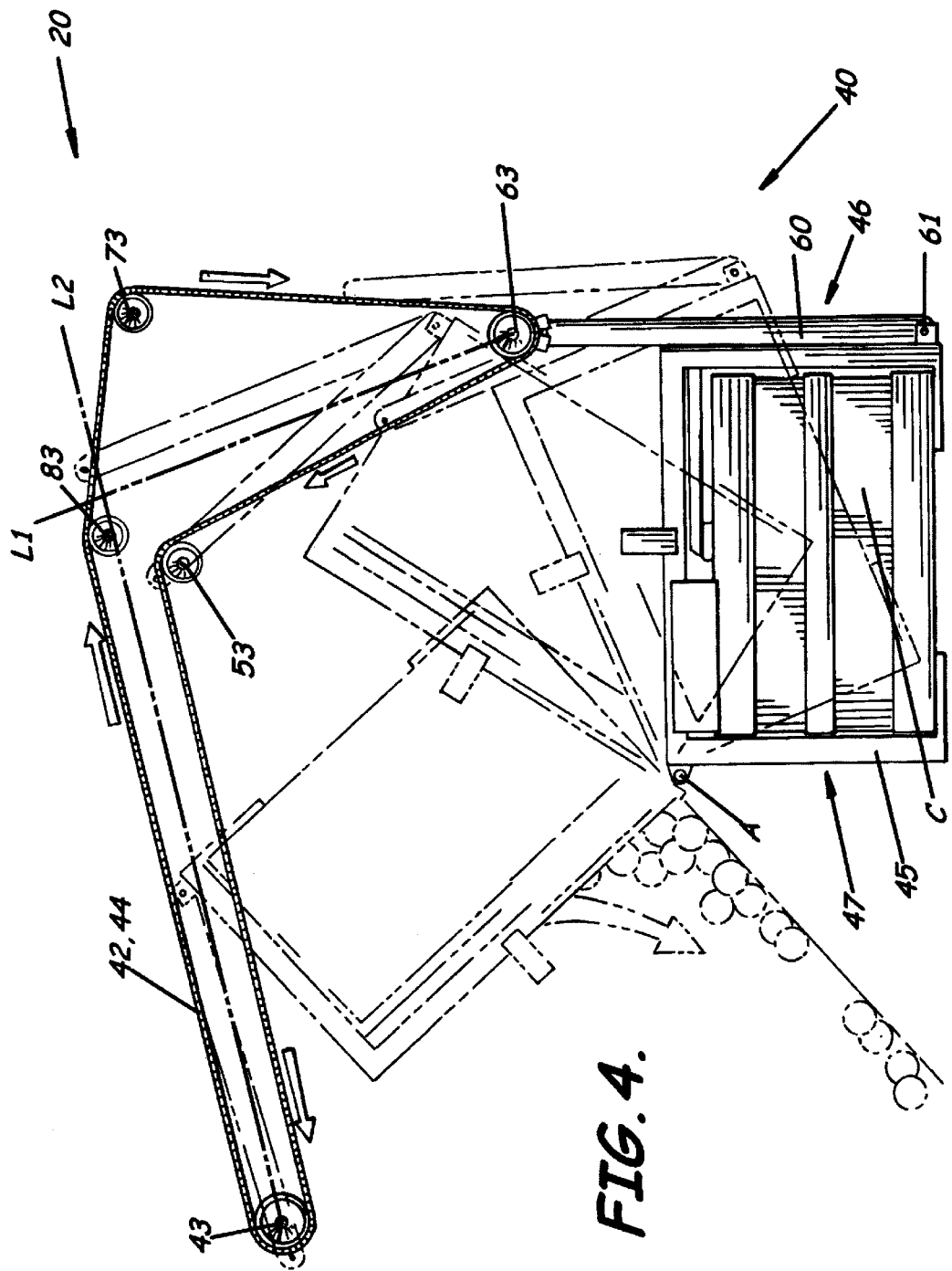
FIG. 4 is a side elevational view of a container contents unloading apparatus, illustrating a carriage, an endless loop and rollers, and carriage-held container being pivotally rotated to effect the smooth discharge of produce contained in the carriage-held container according to the present invention.

The simultaneous movement of the loop-propelled load distributing arm and link, with the resulting rotational pivot of the carriage are tracked in FIG. 4. The net effect is a smoother, more fluid pivotal rotation of the container carriage, and accordingly, a smoother, more fluid pivoting of the carriage-held container. Moreover, smoothness and fluidity are effected by distributing the lift load to the respective ends of the load distributing arm, rather than concentrating it at the center or other single point. The benefits are at least two fold: the product P contained in the containers C is more smoothly discharged from the open-ended containers thereby reducing the risk of injury to the product P during discharging, and the system sustains reduced wear and tear on the mechanical elements of the entire system.

To permit the smooth movement, the load distributing arm 50 over the entire lengths of the closed paths formed by endless loops 42, 44, the respective end portions 52, 54 of the arm 50 are preferably side-connected to the loops. (See FIG. 3). Specifically, with a first loop movingly mounted to an upstream side of the frame and a second loop movingly mounted to a downstream side of the frame, the carriage 45 can be contained within the frame between the respective sides of the frame. With the link 60 connecting the lift arm to the lower portion of the distal end of the carriage 45, and the lift arm 50 extending substantially horizontally to the plane of the base of the frame, the respective ends of the lift arm can be connected to the respective inner sides of the loop as perhaps best illustrated in FIG. 3. As illustrated in FIG. 3, the side connections 52, 53 may be formed by the flanged portions of the "dog-bone" shaped lift arm to form arm-to-side connections to provide greater strength and durability to the connections.

Several alternative arrangements of the rollers will accommodate the features disclosed by the present invention. In FIG. 4, for example, each of a pair of loops 42, 44 is riding on a set of five frame-mounted rollers 43, 53, 63, 73, 83 wherein the rollers of each five-roller set are aligned such that two rollers 63, 73 are positioned adjacent the distal end of the frame at unequal heights in a vertical plane perpendicular to the horizontal plane of the base of the frame, a single roller 43 is positioned substantially near the proximal end of the frame, and two rollers 53, 83 are positioned at unequal heights in a vertical plane perpendicular to the horizontal plane of the base of the frame and are each substantially midway between the distally positioned rollers and the proximally positioned roller. The arrangement of the rollers provides each of the pair of endless loops with two distinct centerlines L1, L2, one of the centerlines extending roughly upward from substantially near the distal end of the frame to a point between the distal end of the frame and the proximal end of the frame, and the other centerline extending roughly downward from the point between the distal end of the frame and the proximal end of the frame to a point substantially near the proximal end of the frame. Moreover, in the particular embodiment disclosed by FIG. 4, the vertical distance between the rollers 63, 73 positioned substantially near the distal end of the frame is greater than the vertical distance between the two rollers 53, 83 positioned substantially midway between the distally positioned rollers and the proximally positioned roller.

The movement, as produced by propelling the load distributing arm along the closed path having only the two distinct inclined centerlines described herein, has a reduced variability in velocity and acceleration, both as to the initial pivot and corresponding return, thereby reducing jerk and effecting a smoother propulsion of the carriage and carriage-held container. The net effect produces a smoother, more fluid movement of pivotal rotation of the carriage and carriage-held container, especially as compared to current boom-induced movements of the link (see e.g. Applicant's earlier patent, Herrin U.S. Pat. No. 5,797,716).

As noted, other arrangements are possible to impart a smoothing effect. For example, each of the pair of loops can be supported on a set of four frame-mounted rollers such that the rollers of each four roller set are aligned so that one roller is positioned substantially near the distal end of the frame, one roller is positioned substantially near the proximal end of the frame, and a pair of rollers is positioned substantially midway between the distally positioned roller and the proximally positioned roller, with the additional feature that each of the pair mid-positioned rollers are at different vertical heights relative to the base of the frame. The dual-loop arrangement coupled with the distinct inclined centerlines per loop allows and provides a smoothing effect according to the present invention.

The movement of the loops in completing a closed path can be provided by any number of drive mechanisms operable with the present invention as described herein. Moreover, as noted above, various control mechanisms can be beneficially incorporated including photo-optic control of the sequencing of conveyance of containers and initiation of pivot lift. Moreover, for complete produce P or other product handling, a chute 90 preferably can be positioned adjacent the carriage to receive slidably discharged product P from a carriage-held, open-ended container C. The discharged contents so received preferably then can be conveyed downstream along a discharged contents conveyor 91 for final handling.

As illustrated in FIGS. 1–4, methods for unloading the contents of open-ended containers are also provided according to the present invention. A method according to the present invention includes smoothly lifting a held container to slidably discharge the product contained therein while distributing the load lift and returning to an originating position the held container for release to a container conveyor. Specifically, the present invention provides a method of unloading the contents of open-ended containers by providing lifting forces substantially distributed along an axis parallel to the pivot axis against an opposing combined load of the carriage and carriage-held container so as to evenly distribute the lifting forces when lifting the proximal end of the carriage about the pivot axis the held container for release to a container conveyor. Moreover, another method according to the present invention includes receiving product slidably discharged from the smoothly pivoted carriage-held-open container, and conveying along a pre-determined path of travel the slidably discharged and received product for further conveying downstream for final processing.

The invention to this point has been described predominately in the context of produce handling, but as already pointed out above, the benefits achieved by the present invention have wide applicability in numerous other activities and industries, such as minerals excavation and chemical handling, indeed in virtually any field of endeavor in which smooth transfer of container contents is to be valued.

Continuing, however, in the context of produce handling, the present invention can also beneficially incorporate a chute that is positioned adjacent both the container conveyor and carriage to receive the slidably discharged product from a carriage-held open-ended container. Moreover this feature can be further coupled with a discharged contents conveyor positioned closely adjacent a lower end of the chute to receive the slidably discharged product from the chute and then convey the slidably discharged product.

In the drawings and specification, there have been disclosed a typical preferred embodiment of the invention, and although specific terms are employed, the terms are used in a descriptive sense only and not for purposes of limitation. The invention has been described in considerable detail with specific reference to these illustrated embodiments. It will be apparent, however, that various modifications and changes can be made within the spirit and scope of the invention as described in the foregoing specification and as defined in the appended claims.

What is claimed is:

1. A container contents unloading apparatus for smoothly unloading contents of open-ended containers, the apparatus comprising:

a container conveyor positioned to convey along a horizontal path of travel a plurality of open-ended containers containing product positioned therein;

a frame overlying said container conveyor positioned downstream from where open-ended containers are received onto the container conveyor;

a carriage to slidably accept and hold open-ended containers being conveyed downstream along the container conveyor and having product positioned therein, the carriage having an upper portion of a proximal end pivotally connected to the frame so as to permit the carriage to pivot about a pivot axis when holding one of the plurality of open-ended containers, slidably discharging the product positioned in the open-ended container, returning to a container receiving position holding the held-open-ended container, and slidably releasing the open-ended container to the container conveyor so as to be able to slidably receive for smooth dumping another open-ended container having product positioned therein;

a load distributing lifter connected to the frame and to the distal end of the carriage to provide lifting forces along an axis parallel to the pivot axis against an opposing combined load of the carriage and carriage-held container so as to evenly distribute the lifting forces when lifting the proximal end of the carriage about the pivot axis, the load distributing lifter comprising at least two spaced-apart tracks connected to the frame and a load distributing lift arm connected to the carriage, said load distributing lift arm having a first end portion connected to one of the at least two spaced-apart tracks and a second end portion connected to a separate one of the at least two spaced-apart tracks and being positioned substantially parallel to the pivot axis so as to distribute the combined load of the carriage and carriage-held container along the length of the arm to each of the at least two spaced-apart tracks;

a chute positioned adjacent said container conveyor and carriage to receive the slidably discharged product from a carriage-held open-ended container; and a discharged contents conveyor positioned closely adjacent a lower end of the chute to receive the slidably discharged product from the chute and convey the slidably discharged product therefrom.

2. A container contents unloading apparatus as defined in claim 1, wherein the load distributing lifter further comprises a link connecting the load distributing arm to a lower portion of the distal end of the carriage.

3. A container contents unloading apparatus as defined in claim 2, wherein each of the at least two spaced-apart tracks comprises:

a first plurality of rollers attached to the frame;

a first spaced-apart endless loop positioned to move on at least two of the first plurality of rollers;

a second plurality of rollers attached to the frame; and a second spaced-apart endless loop positioned to move on at least two of the second plurality of rollers.

4. A container contents unloading apparatus as defined in claim 1, wherein the load distributing lifter comprises:

a first plurality of rollers connected to the frame;

a first endless loop movingly mounted on the first plurality of rollers;

a second plurality of rollers connected to the frame;

a second endless loop movingly mounted on the second plurality of rollers; and a load distributing lift arm connected to the carriage, said load distributing lift arm having a first end portion connected to the first endless loop and a second end portion connected to the second endless loop and being positioned substantially parallel to the pivot axis so as to distribute the divided load of a container positioned in the carriage along the length of the arm to each of the endless loops.

5. A container contents unloading apparatus as defined in claim 4, wherein the first plurality of rollers is connected to an upstream portion of the frame and wherein second plurality of rollers is connected to a downstream portion of the frame.

6. A container contents unloading apparatus as defined in claim 4, wherein the first and second endless loops each have an inner surface contacting each of the plurality of rollers, an outer surface facing a direction opposite that of the inner surface, and two opposing side peripheral portions connected to and extending between the inner and outer surfaces portions, and wherein the first end portion of the load distributing lift arm is connected to one of the side peripheral portions of the first endless loop to permit smooth movement of the arm around the entire length of a closed path formed by the first endless loop, and wherein the second end portion of the load distributing arm is connected to one of the side peripheral portions of the second endless loop to permit smooth movement of the arm around the entire length of a closed path formed by the second endless loop.

7. A container contents unloading apparatus as defined in claim 6, wherein the load distributing lift arm is formed in a "dog-bone" shape having a substantially elongate body portion, a flanged first end portion connected a first end of the elongate body portion to provide enhanced connection strength where the first end portion is side-connected to the first endless loop, and a flanged second end portion connected to a second end of the elongate body portion to provide enhanced connection strength where the second end portion is side-connected to the second endless loop.

8. A container contents unloading apparatus as defined in claim 7, wherein each of the endless loops is mounted on a separate pluralities of rollers positioned to have a first loop portion extending from the lowermost distal end roller to an opposing first open end portion between the distal and proximal ends of the frame, a second loop portion extending from the lowermost proximal end roller to an opposing second open end portion between the distal and proximal ends of the frame, and first and second respective centerlines, the first centerline being a first imaginary straight line extending upwardly from a center of the lowermost distal end roller to the opposing first open end portion and the second centerline being a second imaginary straight line extending upwardly from a center of the lowermost proximal end roller to the opposing second open end portion such that the second centerline is positioned transverse to the first centerline.

9. A container contents unloading apparatus as defined in claim 8, wherein each loop of the pair of loops is riding on a separate plurality of at least four frame-mounted rollers and wherein the rollers of each one of the at least four-roller pluralities are aligned such that one roller is positioned adjacent the distal end of the frame, one roller is positioned adjacent the proximal end of the frame, and a pair of rollers is positioned between the distally positioned roller and the proximally positioned roller, each one of said pair of rollers being positioned at a different vertical height relative to a bottom portion of the frame.

10. A container contents unloading apparatus for smoothly unloading contents of open-ended containers, the apparatus comprising:

a container conveyor positioned to convey along a horizontal path of travel a plurality of open-ended containers containing product positioned therein;

a frame overlying said container conveyor positioned downstream from where open-ended containers are received onto the container conveyor;

a carriage to slidably accept and hold open-ended containers being conveyed downstream along the container conveyor and having product positioned therein, the carriage having an upper portion of a proximal end pivotally connected to the frame so as to permit the carriage to pivot about a pivot axis when holding one of the plurality of open-ended containers, slidably discharging the product positioned in the open-ended container, returning to a container receiving position holding the held-open-ended container, and slidably releasing the open-ended container to the container conveyor so as to be able to slidably receive for smooth dumping another open-ended container having product positioned therein; and a load distributing lifter connected to the frame and to the distal end of the carriage to provide lifting forces along an axis parallel to the pivot axis against an opposing combined load of the carriage and carriage-held container so as to evenly distribute the lifting forces when lifting the proximal end of the carriage about the pivot axis, the load distributing lifter comprising at least two spaced-apart tracks connected to the frame and a load distributing lift arm connected to the carriage, said load distributing lift arm having a first end portion connected to one of the at least two spaced-apart tracks and a second end portion connected to a separate one of the at least two spaced-apart tracks and being positioned substantially parallel to the pivot axis so as to distribute the combined load of the carriage and carriage-held container along the length of the arm to each of the at least two spaced-apart tracks.

11. A container contents unloading apparatus as defined in claim 10, wherein the load distributing lifter further comprises a link connecting the load distributing arm to a lower portion of the distal end of the carriage.

12. A container contents unloading apparatus as defined in claim 11, wherein each of the at least two spaced-apart tracks comprises:

a first plurality of spaced-apart rollers attached to the frame;

a first endless loop positioned to move on at least two of the first plurality of rollers;

a second plurality of spaced-apart rollers attached to the frame; and a second spaced-apart endless loop positioned to move on at least two of the second plurality of rollers.

13. A container contents unloading apparatus as defined in claim 10, wherein the load distributing lifter comprises:

a first plurality of rollers connected to the frame;

a first endless loop movingly mounted on the first plurality of rollers;

a second plurality of rollers connected to the frame;

a second endless loop movingly mounted on the second plurality of rollers; and a load distributing lift arm connected to the carriage, said load distributing lift arm having a first end portion connected to the first endless loop and a second end portion connected to the second endless loop and being positioned substantially parallel to the pivot axis so as to distribute the divided load of a container positioned in the carriage along the length of the arm to each of the endless loops.

14. A container contents unloading apparatus as defined in claim 13, wherein the first plurality of rollers is connected to an upstream portion of the frame and wherein second plurality of rollers is connected to a downstream portion of the frame.

15. A container contents unloading apparatus as defined in claim 13, wherein the first and second endless loops each have an inner surface contacting each of the plurality of rollers, an outer surface facing a direction opposite that of the inner surface, and two opposing side peripheral portions connected to and extending between the inner and outer surfaces portions, and wherein the first end portion of the is connected to one of the side peripheral portions of the first endless loop to permit smooth movement of the arm around the entire length of a closed path formed by the first endless loop, and wherein the second end portion of the load distributing arm is connected to one of the side peripheral portions of the second endless loop to permit smooth movement of the arm around the entire length of a closed path formed by the second endless loop.

16. A container contents unloading apparatus as defined in claim 15, wherein the load distributing lift arm is formed in a "dog-bone" shape having a substantially elongate body portion, a flanged first end portion connected a first end of the elongate body portion to provide enhanced connection strength where the first end portion is side-connected to the first endless loop, and a flanged second end portion connected to a second end of the elongate body portion to provide enhanced connection strength where the second end portion is side-connected to the second endless loop.

17. A container contents unloading apparatus as defined in claim 16, wherein each of the endless loops is mounted on a separate pluralities of rollers positioned to have a first loop portion extending from the lowermost distal end roller to an opposing first open end portion between the distal and proximal ends of the frame, a second loop portion extending from the lowermost proximal end roller to an opposing second open end portion between the distal and proximal ends of the frame, and first and second respective centerlines, the first centerline being a first imaginary straight line extending upwardly from a center of the lowermost distal end roller to the opposing first open end portion and the second centerline being a second imaginary straight line extending upwardly from a center of the lowermost proximal end roller to the opposing second open end portion such that the second centerline is positioned transverse to the first centerline.

18. A container contents unloading apparatus as defined in claim 17, wherein each loop of the pair of loops is riding on a separate plurality of at least four frame-mounted rollers and wherein the rollers of each one of the at least four-roller pluralities are aligned such that one roller is positioned adjacent the distal end of the frame, one roller is positioned adjacent the proximal end of the frame, and a pair of rollers is positioned between the distally positioned roller and the proximally positioned roller, each one of said pair of rollers being positioned at a different vertical height relative to a bottom portion of the frame.

19. A container contents unloading apparatus for smoothly unloading contents of open-ended containers, the apparatus comprising:

a container conveyor positioned to convey along a horizontal path of travel a plurality of open-ended containers containing product positioned therein;

a frame overlying said container conveyor positioned downstream from where open-ended containers are received onto the container conveyor; and container contents discharging means connected to said frame for discharging the product contained in an open-ended container, said container contents discharging means including container receiving means to slidably receive from the container conveyor a container containing product positioned therein and being conveyed along the horizontal path of travel, container holding means for holding an open-ended container during lifting and lowering thereof, pivot means connected to an upper end portion of a proximal end of said container holding means for pivoting said container holding means and a container positioned therein about an upper end pivot axis, and load distribution lifting means connected to a distal lower end portion of said container holding means for providing substantially evenly distributed lifting forces along an axis parallel to the pivot axis against an opposing combined load of the carriage and carriage-held container so as to evenly distribute the lifting forces when lifting the proximal end of the carriage about the pivot axis when upwardly lifting said container holding means from the distal lower end portion thereof, for pivoting said container holding means about the upper end pivot axis to slidably discharge the product contained in the open-ended container being held by said container holding means, and for downwardly lowering said container holding means and an emptied container held therein so as to permit the emptied container to be slidably released onto the container conveyor for conveying the emptied container from said frame along the same generally horizontal plane of travel, the container contents discharging means including at least two spaced-apart tracks connected to the container holding means and the frame and comprising:

a first plurality of rollers attached to the frame
a first spaced-apart endless loop positioned to move on at least two of the first plurality of rollers
a second plurality of rollers attached to the frame and a second spaced-apart endless loop positioned to move on at least two of the second plurality of rollers; and
time and position controlling means operatively connected to said lifting means and said holding means for controlling the time and position of said load distribution lifting means and said container holding means.

20. A container contents unloading apparatus as defined in claim 19, wherein the container contents discharging means includes:

a first plurality of rollers connected to the frame;
a first-endless loop positioned to move on the first plurality of rollers;
a second plurality of rollers connected to the frame;
a second endless loop positioned to move on the second plurality of rollers; and
a load distributing lift arm having a first end portion connected to the first endless loop and a second end portion connected to the second endless loop and being positioned substantially parallel to the pivot axis so as to distribute the divided load of the container contents discharging means.

21. A container contents unloading apparatus as defined in claim 20, wherein the first and second endless loops each have an inner surface contacting each of the plurality of rollers, an outer surface facing a direction opposite that of the inner surface, and two opposing side peripheral portions connected to and extending between the inner and outer surfaces portions, and wherein the first end portion of the is connected to one of the side peripheral portions of the first endless loop to permit smooth movement of the arm around the entire length of a closed path formed by the first endless loop, and wherein the second end portion of the load distributing arm is connected to one of the side peripheral portions of the second endless loop to permit smooth movement of the arm around the entire length of a closed path formed by the second endless loop.

22. A container contents unloading apparatus as defined in claim 21, wherein the load distributing lift arm is formed in a "dog-bone" shape having a substantially elongate body portion, a flanged first end portion connected a first end of the elongate body portion to provide enhanced connection strength where the first end portion is side-connected to the first endless loop, and a flanged second end portion connected to a second end of the elongate body portion to provide enhanced connection strength where the second end portion is side-connected to the second endless loop.

23. A container contents unloading apparatus as defined in claim 22, wherein each of the endless loops is mounted on a separate pluralities of rollers positioned to have a first loop portion extending from the lowermost distal end roller to an opposing first open end portion between the distal and proximal ends of the frame, a second loop portion extending from the lowermost proximal end roller to an opposing second open end portion between the distal and proximal ends of the frame, and first and second respective centerlines, the first centerline being a first imaginary straight line extending upwardly from a center of the lowermost distal end roller to the opposing first open end portion and the second centerline being a second imaginary straight line extending upwardly from a center of the lowermost proximal end roller to the opposing second open end portion such that the second centerline is positioned transverse to the first centerline.

24. A container contents unloading apparatus as defined in claim 23, wherein each loop of the pair of loops is riding on separate plurality of at least four frame-mounted rollers and wherein the rollers of each one of the at least four-roller pluralities are aligned such that one roller is positioned adjacent the distal end of the frame, one roller is positioned adjacent the proximal end of the frame, and a pair of rollers is positioned between the distally positioned roller and the proximally positioned roller, each one of said pair of rollers being positioned at a different vertical height relative to a bottom portion of the frame.

25. A container contents unloading apparatus for smoothly unloading contents of open-ended containers, the apparatus comprising:

a container conveyor positioned to convey along a horizontal path of travel a plurality of open-ended containers containing product positioned therein;
a frame overlying said container conveyor positioned downstream from where open-ended containers are received onto the container conveyor;
a carriage to slidably accept and hold open-ended containers being conveyed downstream along the container conveyor and having product positioned therein, the carriage having an upper portion of a proximal end pivotally connected to the frame so as to permit the carriage to pivot about a pivot axis when holding one of the plurality of open-ended containers, slidably discharging the product positioned in the open-ended container, returning to a container receiving position holding the held-open-ended container, and slidably releasing the open-ended container to the container conveyor so as to be able to slidably receive for smooth dumping another open-ended container having product positioned therein;
a load distributing lifter connected to the frame and to the distal end of the carriage to provide lifting forces along an axis parallel to the pivot axis against an opposing combined load of the carriage and carriage-held container so as to evenly distribute the lifting forces when lifting the proximal end of the carriage about the pivot axis, the load distributing lifter comprising:
   at least two spaced-apart tracks connected to the frame to propel and guide movement of the carriage about the pivot axis to slidably discharge the product contained in carriage-held container and to return the carriage-held container and carriage to a container release and receive position,
   a load distributing lift arm connected to the at least two tracks, and
   a link connecting the load distributing arm to a lower portion of the distal end of the carriage;
a chute positioned adjacent said container conveyor and carriage to receive the slidably discharged product from a carriage-held open-ended container; and
a discharged contents conveyor positioned closely adjacent a lower end of the chute to receive the slidably discharged product from the chute and convey the slidably discharged product therefrom.

26. A container contents unloading apparatus for smoothly unloading contents of open-ended containers, the apparatus comprising:
   a container conveyor positioned to convey along a horizontal path of travel a plurality of open-ended containers containing product positioned therein;
   a frame overlying said container conveyor positioned downstream from where open-ended containers are received onto the container conveyor;
   a carriage to slidably accept and hold open-ended containers being conveyed downstream along the container conveyor and having product positioned therein, the carriage having an upper portion of a proximal end pivotally connected to the frame so as to permit the carriage to pivot about a pivot axis when holding one of the plurality of open-ended containers, slidably discharging the product positioned in the open-ended container, returning to a container receiving position holding the held-open-ended container, and slidably releasing the open-ended container to the container conveyor so as to be able to slidably receive for smooth dumping another open-ended container having product positioned therein;
   a load distributing lifter connected to the frame and to the distal end of the carriage to provide lifting forces along an axis parallel to the pivot axis against an opposing combined load of the carriage and carriage-held container so as to evenly distribute the lifting forces when lifting the proximal end of the carriage about the pivot axis, load distributing lifter comprising:
      a first plurality of rollers connected to the frame,
      a first endless loop movingly mounted on the first plurality of rollers,
      a second plurality of rollers connected to frame,
      a second endless loop movingly mounted on the second plurality of rollers, and
      a load distributing lift arm connected to the carriage, said load distributing lift arm having a first end portion connected to the first endless loop and a second end portion connected to the second endless loop and being positioned substantially parallel to the pivot axis so as to distribute the divided load of a container positioned in the carriage along the length of the arm to each of the endless loops;
   a chute positioned adjacent said container conveyor and carriage to receive the slidably discharged product from a carriage-held open-ended container; and
   a discharged contents conveyor positioned closely adjacent a lower end of the chute to receive the slidably discharged product from the chute and convey the slidably discharged product therefrom.

27. A container contents unloading apparatus for smoothly unloading contents of open-ended containers, the apparatus comprising:
   a container conveyor positioned to convey along a horizontal path of travel a plurality of open-ended containers containing product positioned therein;
   a frame overlying said container conveyor positioned downstream from where open-ended containers are received onto the container conveyor;
   a carriage to slidably accept and hold open-ended containers being conveyed downstream along the container conveyor and having product positioned therein, the carriage having an upper portion of a proximal end pivotally connected to the frame so as to permit the carriage to pivot about a pivot axis when holding one of the plurality of open-ended containers, slidably discharging the product positioned in the open-ended container, returning to a container receiving position holding the held-open-ended container, and slidably releasing the open-ended container to the container conveyor so as to be able to slidably receive for smooth dumping another open-ended container having product positioned therein; and
   a load distributing lifter connected to the frame and to the distal end of the carriage to provide lifting forces along an axis parallel to the pivot axis against an opposing combined load of the carriage and carriage-held container so as to evenly distribute the lifting forces when lifting the proximal end of the carriage about the pivot axis, the load distributing lifter comprising:
      at least two spaced-apart tracks connected to the frame to propel and guide movement of the carriage about the pivot axis to slidably discharge the product contained in carriage-held container and to return the carriage-held container and carriage to a container release and receive position,
      a load distributing lift arm connected to the at least two tracks, and
      a link connecting the load distributing arm to a lower portion of the distal end of the carriage.

28. A container contents unloading apparatus for smoothly unloading contents of open-ended containers, the apparatus comprising:
   a container conveyor positioned to convey along a horizontal path of travel a plurality of open-ended containers containing product positioned therein;
   a frame overlying said container conveyor positioned downstream from where open-ended containers are received onto the container conveyor;
   a carriage to slidably accept and hold open-ended containers being conveyed downstream along the container conveyor and having product positioned therein, the carriage having an upper portion of a proximal end pivotally connected to the frame so as to permit the carriage to pivot about a pivot axis when holding one of the plurality of open-ended containers, slidably discharging the product positioned in the open-ended container, returning to a container receiving position holding the held-open-ended container, and slidably releasing the open-ended container to the container conveyor so as to be able to slidably receive for smooth dumping another open-ended container having product positioned therein; and a load distributing lifter connected to the frame and to the distal end of the carriage to provide lifting forces along an axis parallel to the pivot axis against an opposing combined load of the carriage and carriage-held container so as to evenly distribute the lifting forces when lifting the proximal end of the carriage about the pivot axis, the load distributing lifter comprising:

a first plurality of rollers connected to the frame, a first endless loop movingly mounted on the first plurality of rollers, a second plurality of rollers connected to the frame, a second endless loop movingly mounted on the second plurality of rollers, and a load distributing lift arm connected to the carriage, said load distributing lift arm having a first end portion connected to the first endless loop and a second end portion connected to the second endless loop and being positioned substantially parallel to the pivot axis so as to distribute the divided load of a container positioned in the carriage along the length of the arm to each of the endless loops.

* * * * *